(12) United States Patent
Drews

(10) Patent No.: US 6,744,983 B2
(45) Date of Patent: Jun. 1, 2004

(54) OPTICAL SWITCHING MATRIX

(75) Inventor: Wolfgang Drews, Grobenzell (DE)

(73) Assignee: Siemens Aktiengesellschaft, Munich (DE)

( * ) Notice: Subject to any disclaimer, the term of this patent is extended or adjusted under 35 U.S.C. 154(b) by 108 days.

(21) Appl. No.: 09/990,695

(22) Filed: Nov. 9, 2001

(65) Prior Publication Data

US 2002/0081063 A1 Jun. 27, 2002

(30) Foreign Application Priority Data

Nov. 9, 2000 (DE) .......................... 100 55 476

(51) Int. Cl.⁷ .............................. H04J 14/00; G02S 6/28
(52) U.S. Cl. .............................. 398/45; 398/50; 398/48; 398/49; 385/17; 385/24
(58) Field of Search .............................. 398/45, 48, 50, 398/55, 56, 59

(56) References Cited

U.S. PATENT DOCUMENTS

| 5,471,332 A | 11/1995 | Shiragaki et al. | 359/117 |
| 6,115,517 A * | 9/2000 | Shiragaki et al. | 385/24 |
| 6,366,716 B1 * | 4/2002 | Graves | 385/17 |
| 2002/0044718 A1 * | 4/2002 | Nishi et al. | 385/17 |
| 2002/0131678 A1 * | 9/2002 | Bentivoglio et al. | 385/17 |

FOREIGN PATENT DOCUMENTS

| DE | 43 37 089 | 5/1995 | H04B/10/20 |

* cited by examiner

Primary Examiner—Brian Healy
Assistant Examiner—Kevin S. Wood
(74) Attorney, Agent, or Firm—Bell Boyd & Lloyd LLC

(57) ABSTRACT

A configurable optical matrix for coupling data streams into and out of an optical WDM data transmission ring, a number of M×N matrices, preferably four square N×N through matrices, being connected together, via a network of switches and splitters, in such a way that, if possible, any connections can be switched between the inputs and outputs connected into the data link and between branching feeders and outgoers, it preferably being possible at the same time for possible backup switching of the optical channels to be achieved as well.

12 Claims, 6 Drawing Sheets

OPTICAL SWITCHING MATRIX

BACKGROUND OF THE INVENTION

The present invention relates to an optical switching matrix as an intermediate element in an optical data transmission link of a WDM system, having a large number of channels for the variable input and/or output coupling of a large number of optical channels.

Because of the meteoric increase in data traffic in communications networks, network operators require increasingly higher transport capacities which, in the backbone sector, lie at multiples of the basic capacities of 2.5 Gb/s, 10 Gb/s and, in the future, even 40 Gb/s. Such a basic capacity corresponds to a specific optical channel (OCh) which, in turn, corresponds to a specific carrier frequency. In this case, the multiplexing of these optical channels on an optical fiber is increasingly carried out with the aid of the optical wavelength division multiplex technique (WDM). In addition to simple point-to-point connections, interlinked network structures and ring structures are also needed. For the connection of data systems, these network structures require optical channels to be coupled into and out of the optical data transmission links.

A completely symmetrical N×N matrix requires an implementation expenditure proportional to $N^2$. However, this expenditure can be reduced significantly if, instead of complete symmetry, only specific preferred combinations of optical signals have to be implemented in a switching matrix.

It is an object of the present invention, therefore, to find a flexible optical matrix which can be produced with existing basic modules for coupling a number of optical channels into and out of a WDM ring transmission network. Such devices, used in conjunction with a wavelength division multiplex system, are also referred to as optical add/drop multiplexer (OADM).

SUMMARY OF THE INVENTION

The present inventor has discovered that it is possible to build up a configurable switching matrix with the aid of existing M×N matrices and a network of multiple switches and multiple splitters which, via suitable control software, can be configured flexibly and quickly from outside.

In addition, it has been shown that an OADM according to the present invention can also implement various backup switching methods, by which the reliability of the optical transport network in which the OADM according to the present invention is used can be increased substantially and simply in the event of fiber faults.

For backup switching of optical channels, various methods can be used. For example, for ring architectures, the methods of "Optical Channel Dedicated Protection Ring" (OCh DPRING) and "Optical Channel Shared Protection Ring" (OCh SPRING) can be used. The implementation of these backup switching methods can be carried out within the switching matrix according to the present invention, since here access is made to the individual optical channels.

In accordance with these inventive ideas, the present inventor firstly proposes a unidirectional optical switching matrix as an intermediate element in an optical data transmission link of a WDM system having a large number of channels to couple a large number of optical channels variably in and/or out, a first side (West side) with N input channels and a second side (East side) with N output channels being provided to be incorporated into the optical data transmission link and, in addition, a third side (feeder side) having a large number of channels that are coupled in and/or out being provided, an M×N input matrix for the N input channels being provided on the first side, and an M×N output matrix for the N output channels being provided on the second side, and the first and second sides being connected to each other and to the input and output channels of the third side by a variably switchable network (ADP module). The basic constituents of such a large switching matrix can be simple, commercially available optical M×N matrices, optical switches and splitters, which are connected together in the manner according to the present invention.

In an embodiment, it is also proposed to design the optical switching matrix bidirectionally in that, additionally, an M×N output matrix for an additional N output channels is provided on the first side, and an M×N input matrix for an additional N input channels is provided on the second side.

In a preferred embodiment of the optical switching matrix according to the present invention, it is proposed that the variably switchable network have a distributor with a distributor input and at least two distributor outputs on at least one input channel, downstream of the M×N input matrix of the first and/or second side, at least one distributor output leading to an output channel on the respectively opposite side, and at least one distributor output leading to an output on the third side.

In addition, the variably switchable network can have a controllable switch having at least two switch inputs and a switch output on at least one output channel upstream of the M×N output matrix of the first and/or second side, at least one switch input leading to an input channel on the respectively opposite first or second side, and at least one switch input leading to an input channel on the third side.

In addition, the variably switchable network can have a distributor with a distributor input and at least two distributor outputs on the third side (feeder side) on at least one input channel, at least one distributor output leading to an output channel on the first or second side.

In a further embodiment, provision is also made for the variably switchable network to have a switch (feeder switch) with a switch output and at least two switch inputs on at least one output channel, at least one switch input leading to an input channel on the first or second side.

The part components provided in the optical switching matrix according to the present invention can be square matrices, that is to say N×N matrices. Pursuant to this, for example by connecting together four N×N matrices, a 4N×4N switching for an OADM may be set up, N switches and N distributors preferably being provided on the third side (feeder side).

In this case, the variable network can be constructed in such a way that a single-redundancy (1+1) channel backup circuit or a ring backup circuit with distributed redundancy (shared protection) results, as defined in existing standards, for example ITU-T G.841.

Additional features and advantages of the present invention are described in, and will be apparent from, the following Detailed Description of the Invention and the Figures.

DETAILED DESCRIPTION OF THE INVENTION

Figure 1:
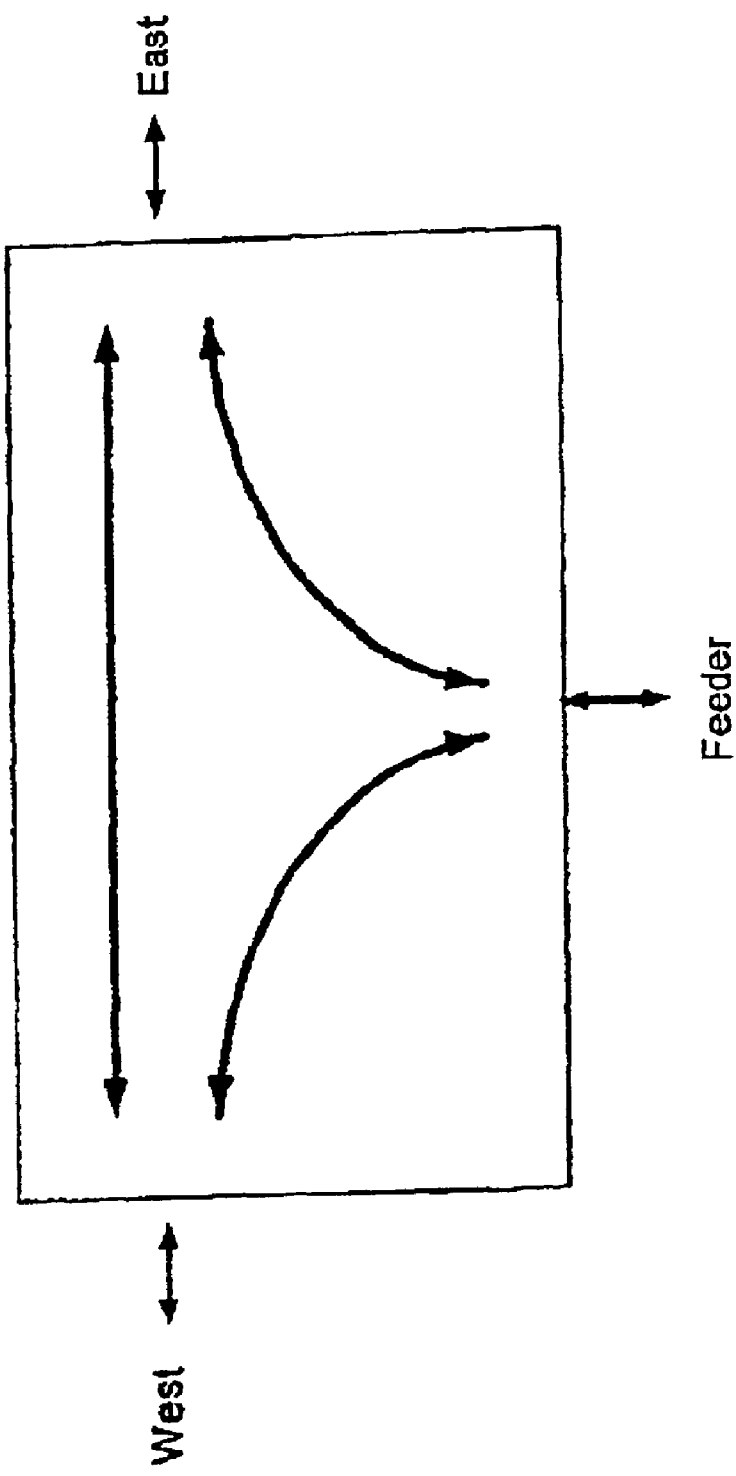
FIG. 1 shows traffic flow directions in an OADM.

FIG. 1 shows the basic optical traffic flow directions in an OADM.

This shows schematically how each incoming channel on the West or East side is connected to the respectively opposite side as an outgoing channel. In addition, the overview shows that connecting paths are provided both from the West and the East side to and from the feeder side. These traffic flow directions are to be capable of implementation with the following switching matrix structures.

Figure 2:
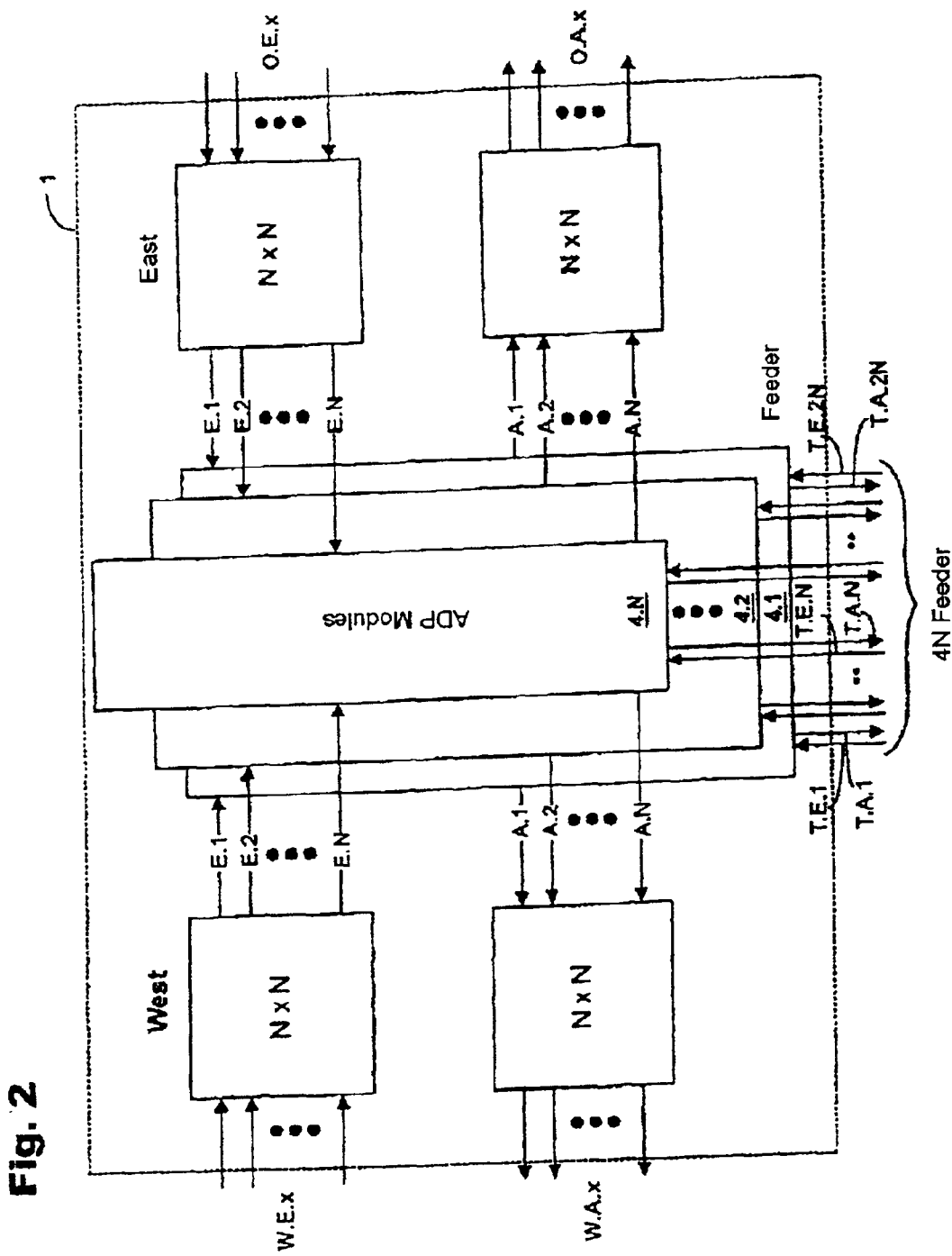
FIG. 2 shows possible connecting structures in the ADP module for a bidirectional switching matrix.

FIG. 2 shows the functional subdivision of a preferred embodiment of a bidirectional optical (4N×4N) switching matrix 1. On the West side (first side) and the East side (second side) there is, in each case, a commercially available square (N×N) input matrix and an (N×N) output matrix 2, which permit optional input and output coupling for each of the N optical input channels W.E.1–W.E.N, O.E.1–O.E.N and output channels W.A.1–W.A.N, O.A.1–O.A.N on the respective side. At the center there are N add/drop and protection modules (ADP modules) 4.1–4.N, which implement either the requisite input or output coupling of the selected optical channels on the feeder side (third side) T.E.1–T.E.2N, T.A.1–T.A.2N, or an East-West through connection or West-East through connection between optical input and output channels.

Each ADP module 4.1 . . . 4.N permits access to two feeder input and output channels T.E.X, T.E.X+1, T.A.X, T.A.X+1 in each case. For each OADM, according to the traffic flow directions shown in FIG. 1, the only connections which have to be provided in each ADP module are between the West and feeder side, between the East and feeder side and between the East and West side. On the other hand, loop connections East-East, West-West and feeder-feeder do not need to be provided, such that the implementation expenditure can be kept low overall.

In order to implement complex backup switching mechanisms, in particular those having distributed redundancy in two-fiber or four-fiber rings, it is also possible for two such ADP modules to be combined into a more complex ADP module. In this case, on the East and West side of an OADM, in each case an optical operating channel and an optical backup channel are driven by an ADP module. Depending on the backup switching method for the individual optical channels, different ADP modules with different complexities may be used, but are all constructed from optical components which are currently available.

Figure 3:
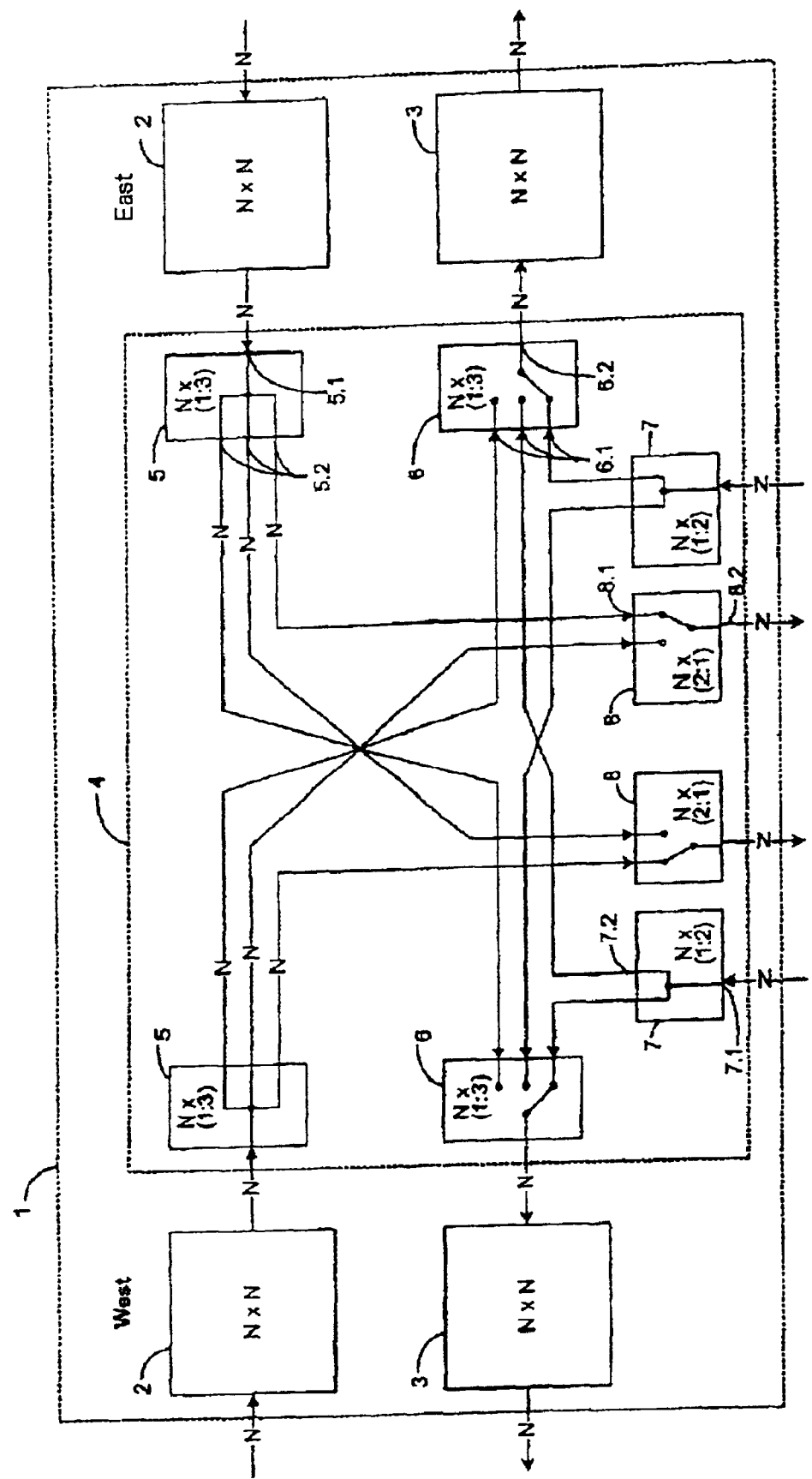
FIG. 3 shows a switching matrix architecture with support from optical (1+1) channel backup switching in rings (DPRING).

An example of a more complex construction of an optical backup circuit is shown in FIG. 3. The more detailed design shows a (4N×4N) switching matrix 1, which is able to support optical (1+1) channel backup switching in rings (dedicated protection ring, DPRING). In the illustration, just as in all the following Figures, only one level, that is to say one module of the N identical backup ADP modules 4, is shown.

Each ADP module 4 has two 1:3 input distributors 5, which distribute a channel from the N×N input matrix 2 in such a way that a connection is produced to the opposite N×N output matrix 3 with its upstream, controllable 1:3 output switch 6 and two connections to two 2:1 switches 8 on the feeder side. In addition, each ADP module 4 has two 1:2 distributors which distribute their incoming channels to, in each case, one 3:1 output switch on the two other sides (West and East).

The resulting (4N×4N) switching matrix of FIG. 3 is designed to be free of blockages within these provided connecting structures, which correspond to the design in FIG. 2.

Figure 3A:
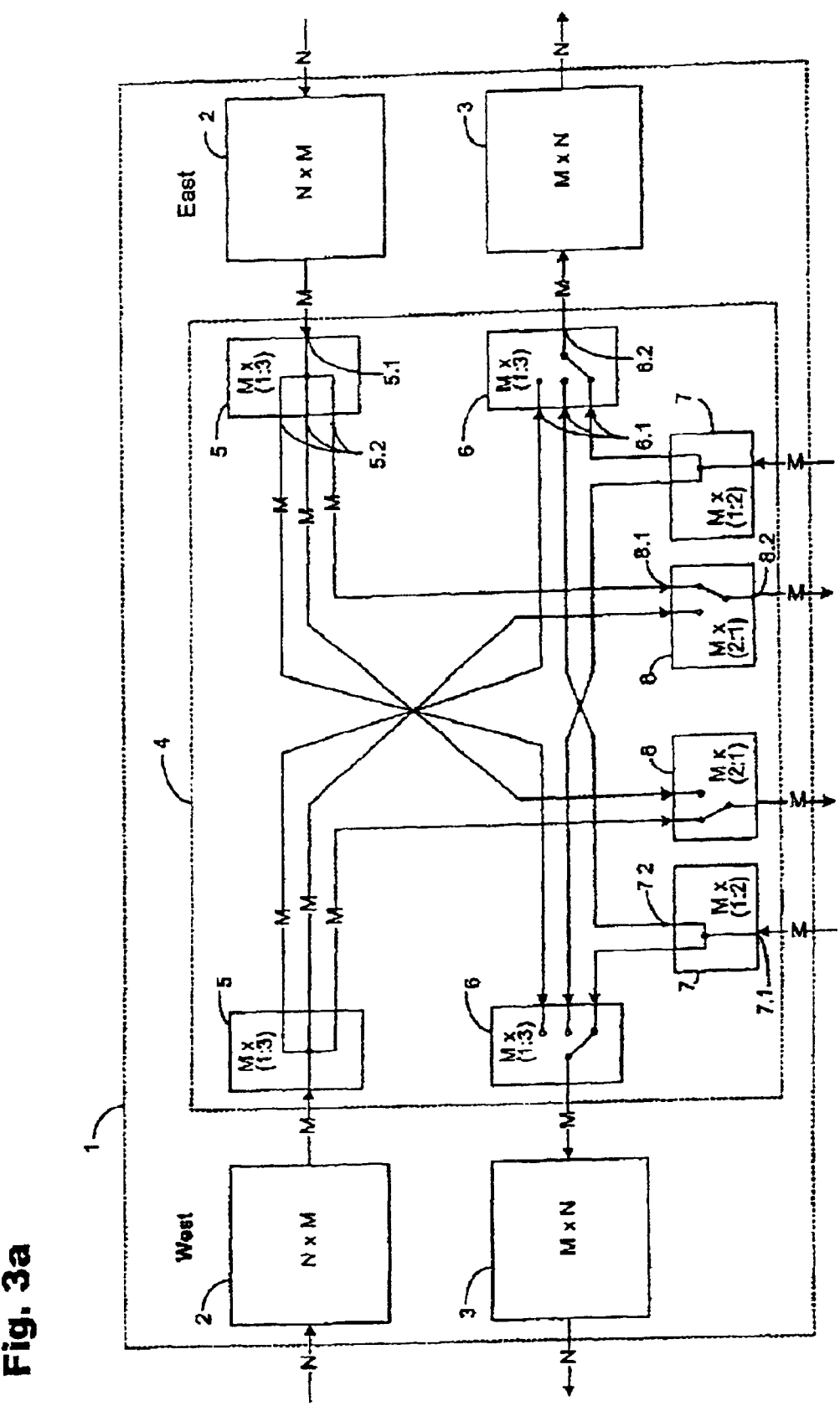
FIG. 3a shows a variant of FIG. 3.

FIG. 3a shows an optical switching matrix according to the present invention which is constructed in accordance with the switching matrix from FIG. 3, but here M×N input matrices and M×N output matrices are used instead of square N×N input matrices. The functioning and connecting structure corresponds to that from FIG. 3.

Figure 4:
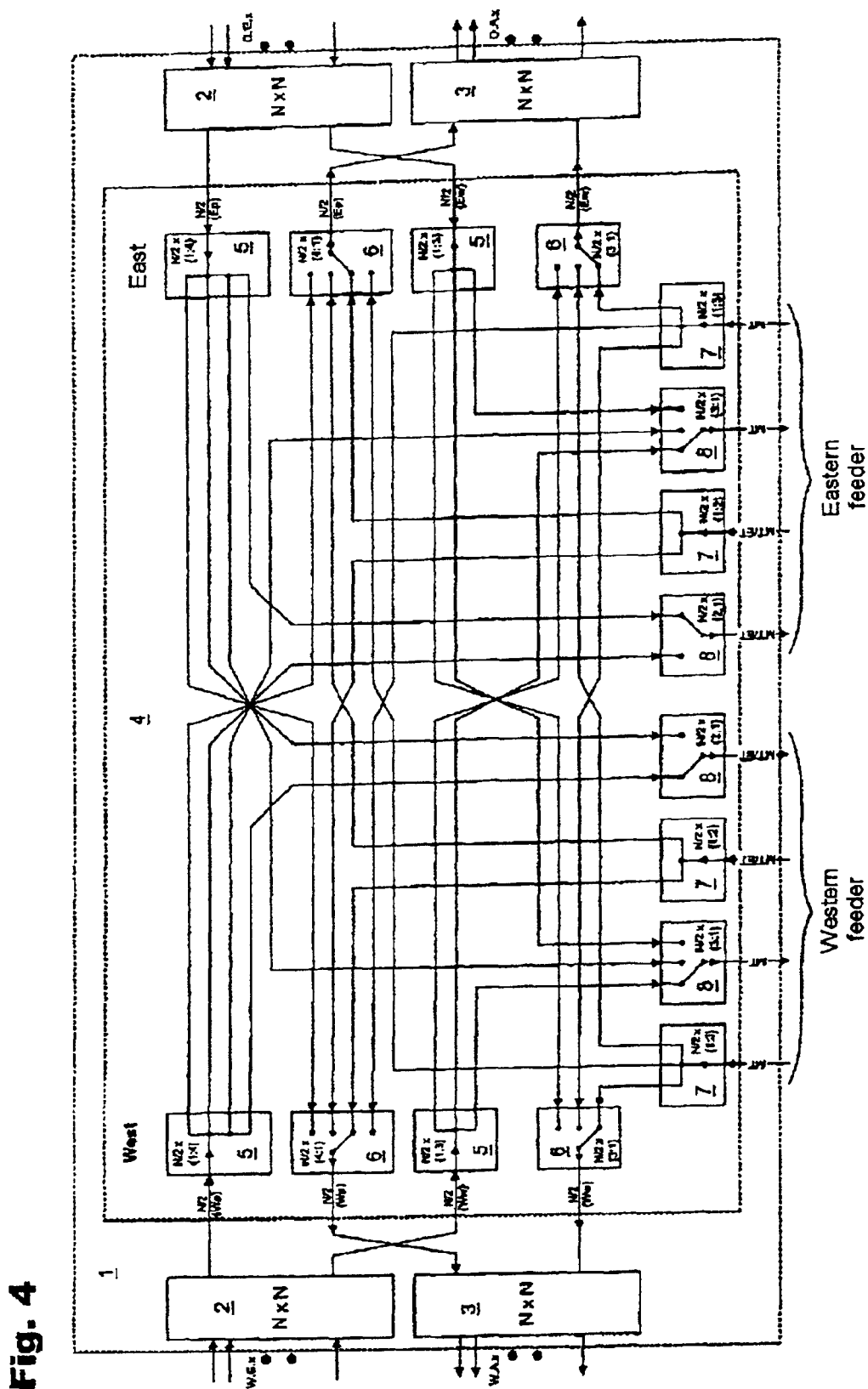
FIG. 4 shows a switching matrix architecture with support from optical channel backup switching with distributed redundancy (shared protection) in two-fiber rings (2F-SPRING).

FIG. 4 shows an (4N×4N) switching matrix 1, whose ADP modules 4, in addition to FIG. 4, support optical channel backup switching in two-fiber rings with distributed backup channels (2-fiber shared protection ring, 2F-SPRING). For this purpose, four channels have to be processed by one ADP module 4 and such an ADP module 4 can be produced by combining two ADP modules from FIG. 3 and supplementing the necessary backup switching paths for the 2F-SPRING method. It is also possible here for "extra traffic" to be switched onto the backup channels, in order to make full use of the ring capacity in the fault-free case. The functioning of the 2F-SPRING method for optical channels corresponds to the method for virtual channels (VC–4) in SDH networks described in ITU-T G.841.

Figure 5:
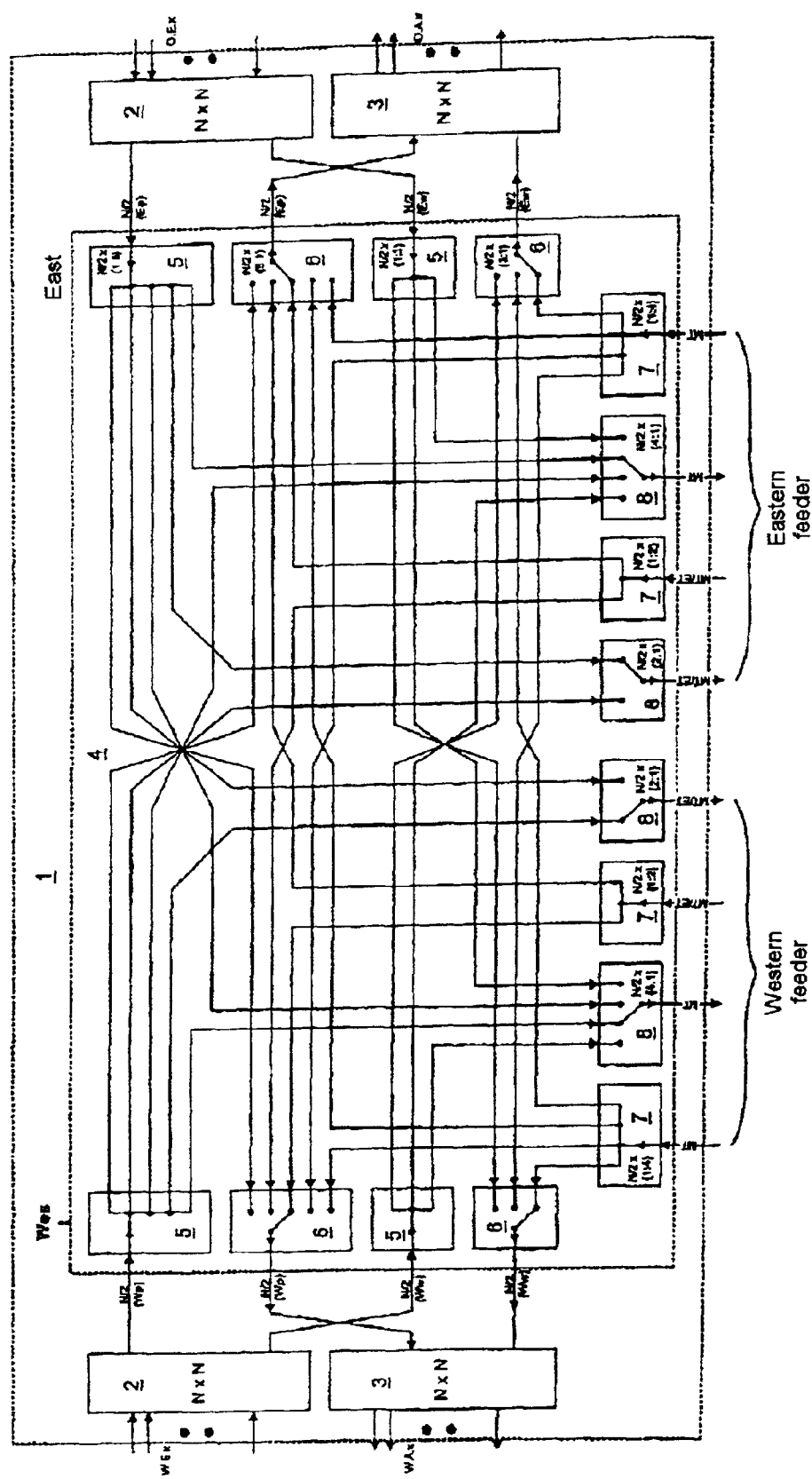
FIG. 5 shows a switch matrix architecture with support from optical channel backup switching with distributed redundancy (shared protection) in four-fiber rings (4F-SPRING).

FIG. 5 shows a further refinement of the (4N×4N) switching matrix from FIG. 4. Its ADP modules 4 have more extensive interlinking than those used in FIG. 4. For example, here optical channel backup switching in four-fiber rings with distributed backup channels (4-fiber shared protection ring, 4F-SPRING) is supported. Here too, "extra traffic" can be switched to the backup channels, in order to make full use of the ring capacity in the fault-free case. The functioning of the 4F-SPRING method for optical channels corresponds to the method for virtual channels (VC–4) in SDH networks described in ITU-T G.841.

Finally, it is pointed out that the designations A×(B:C) in the switches and distributors 5 to 8 refers to the fact that these are A-fold switches or distributors having B inputs and C switch positions or outputs.

Finally, it is necessary to point out that the scope of the present invention also includes constructing the internal connecting networks of an OADM with different ADP modules for different optical channels, by which the complexity and flexibility of the switching matrix can be matched to the respective requirements of the external network structure.

In summary, therefore, the present inventor proposes to obtain a configurable optical matrix for coupling data streams into and out of an optical WDM data transmission ring by a number of M×N matrices, preferably four square N×N through matrices being connected together via a network of switches and splitters, in such a way that, if possible, any connections between the inputs and outputs connected into the data link and between branching feeders and outgoers can be switched, it preferably being possible at the same time to achieve possible backup switching of the optical channels.

It goes without saying that the abovementioned features of the present invention can be used not only in the respectively specified combination but also in other combinations or on their own, without departing from the scope of the invention. Indeed, although the present invention has been described with reference to specific embodiments, those of skill in the art will recognize that changes may be made thereto without departing from the spirit and scope of the invention as set forth in the hereafter appended claims.

What is claimed is:

1. An optical switching matrix as an intermediate element in an optical data transmission link of a WDM ring transmission system for variable input and output coupling of a plurality of optical channels, comprising:

a first side having N input channels coming out from the optical WDM data transmission link, where N is greater than 1;

a second side having N output channels for incorporation into the optical WDM data transmission link;

a third side having a plurality of channels coupled to the optical WDM data transmission link, the coupling being at least one of an input coupling of M channels and an output coupling of M channels, where M is greater than 1;

an input N×M matrix for the N input channels provided on the first side;

an output M×N matrix for the N output channels provided on the second side; and a variably switchable network, wherein the first and second sides are connected to each other and to the input and output channels of the third side via the variably switchable network.

2. An optical switching matrix as an intermediate element in an optical data transmission link of a WDM ring transmission system as claimed in claim 1, further comprising:

an additional output M×N matrix for an additional N output channels provided on the first side; and an additional input N×M matrix for an additional N input channels provided on the second side.

3. An optical switching matrix as an intermediate element in an optical data transmission link of a WDM ring transmission system as claimed in claim 2, further comprising:

a distributor as part of the variably switchable network, the distributor including a distributor input and at least two distributor outputs, the distributor input leading to an output at least one of the input N×M matrix of the first side and the additional input N×M matrix of the second side, one of the distributor outputs leading to at least one of the output coupling of channels on the third side, and another of the distributor outputs leading to an input of at least one of the output M×N matrix on the second side and the additional output M×N matrix on the first side.

4. An optical switching matrix as an intermediate element in an optical data transmission link of a WDM ring transmission system as claimed in claim 2, further comprising:

a controllable switch as part of the variably switchable network, the controllable switch including at least two switch inputs and a switch output and at least one output channel upstream of at least one of the output M×N matrix of the first side and the additional output M×N matrix of the second side, at least one of the switch inputs leading to an input channel on a respectively opposite side, and at least one of the switch inputs leading to at least one of the input coupling of channels on the third side.

5. An optical switching matrix as an intermediate element in an optical data transmission link of a WDM ring transmission system as claimed in claim 2, further comprising:

a distributor as part of the variably switchable network, the distributor including a distributor input and at least two distributor outputs, the distributor input leading to at least one of the input coupling of channels on the third side, and at least one of the distributor outputs leading to an input channel of at least one of the output M×N matrix on the second side and the additional output M×N matrix on the first side.

6. An optical switching matrix as an intermediate element in an optical data transmission link of a WDM ring transmission system as claimed in claim 2, further comprising:

a switch as part of the variably switchable network, the switch including a switch output and at least two switch inputs, the switch output leading to at least one of the input coupling of channels on the third side, and at least one of the switch inputs leading to an output channel of at least one of the input N×M matrix on the first side and the additional input N×M matrix on the second side.

7. An optical switching matrix as an intermediate element in an optical data transmission link of a WDM ring transmission system as claimed in claim 1, wherein at least one of the input N×M matrix and the output M×N matrix is provided as a switch with a square structure.

8. An optical switching matrix as an intermediate element in an optical data transmission link of a WDM ring transmission system as claimed in claim 1, further comprising:

N output switches and N input distributors on the third side.

9. An optical switching matrix as an intermediate element in an optical data transmission link of a WDM ring transmission system as claimed in claim 1, wherein the variably switchable network includes a single-redundancy ring backup circuit.

10. An optical switching matrix as an intermediate element in an optical data transmission link of a WDM ring transmission system as claimed in claim 1, wherein the variably switchable network includes a two-fiber ring backup circuit with distributed redundancy.

11. An optical switching matrix as an intermediate element in an optical data transmission link of a WDM ring transmission system as claimed in claim 1, wherein the variably switchable network includes a four-fiber ring backup circuit with distributed redundancy.

12. An optical switching matrix as an intermediate element in an optical data transmission link of a WDM ring transmission system as claimed in claim 1, wherein functions of the variably switchable network with switches and distributors are combined in at least one variably switchable network module, for each channel, in an overall variably switchable network module having a total of N variably switchable network modules.

* * * * *